(12) United States Patent
Ruge

(10) Patent No.: US 8,272,503 B2
(45) Date of Patent: Sep. 25, 2012

(54) SUPPORT DEVICE FOR A CONVEYOR INSTALLATION AND METHOD FOR OPERATION OF A CONVEYOR INSTALLATION

(75) Inventor: Martin Ruge, Starrkirch-Wil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 241 days.

(21) Appl. No.: 12/861,315

(22) Filed: Aug. 23, 2010

(65) Prior Publication Data

US 2011/0042183 A1 Feb. 24, 2011

(30) Foreign Application Priority Data

Aug. 24, 2009 (CH) ....................................... 1308/09

(51) Int. Cl.
*B65G 21/20* (2006.01)
(52) U.S. Cl. ................ 198/779; 198/842; 198/833
(58) Field of Classification Search ............ 198/779, 198/842, 833
See application file for complete search history.

(56) References Cited

U.S. PATENT DOCUMENTS

| 2,868,356 | A | * | 1/1959 | Haaff | 198/833 |
| 5,174,437 | A | * | 12/1992 | Burger | 198/842 |
| 5,415,274 | A | * | 5/1995 | Krismanth et al. | 198/833 |
| 6,318,544 | B1 | * | 11/2001 | O'Connor et al. | 198/853 |
| 7,426,992 | B2 | * | 9/2008 | Fourney | 198/779 |
| 7,721,874 | B2 | * | 5/2010 | Chen | 198/779 |
| 7,942,257 | B2 | * | 5/2011 | DePaso et al. | 198/779 |
| 8,109,384 | B2 | * | 2/2012 | Pressler et al. | 198/779 |

FOREIGN PATENT DOCUMENTS

| DE | 20 2007 011 352 | 11/2007 |
| FR | 2 271 442 | 12/1975 |
| GB | 403 082 | 12/1933 |

OTHER PUBLICATIONS

International Search Report.

* cited by examiner

*Primary Examiner* — Mark A Deuble
(74) *Attorney, Agent, or Firm* — Rankin, Hill & Clark LLP

(57) ABSTRACT

A support device for the support of conveyed objects includes a roller body with a series of rollers, which run along a path and support the conveyed objects in a support region. The rollers roll in the support region on a support surface. Thereby, the following steps are carried out:
 relieving the rollers on entering into a part region of the support region;
 aligning the relieved rollers;
 renewed loading of the rollers on leaving the part region of the support device. For this, at least one recess of the support surface is present in the support region, wherein a roller which is located in the region of the recess, may be moved into the recess.

17 Claims, 6 Drawing Sheets

A-A

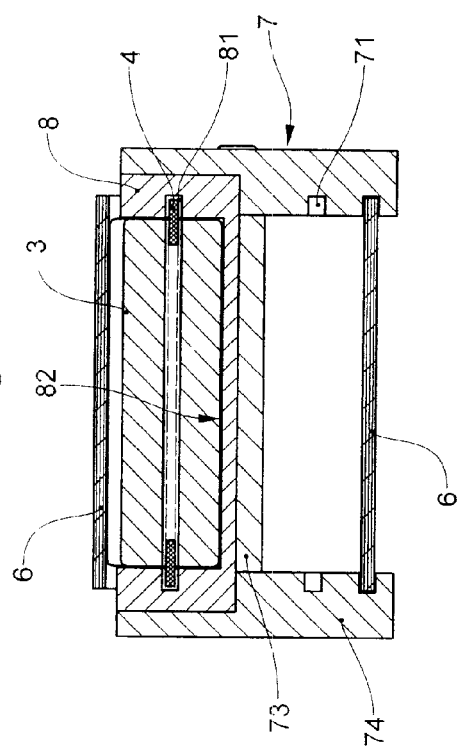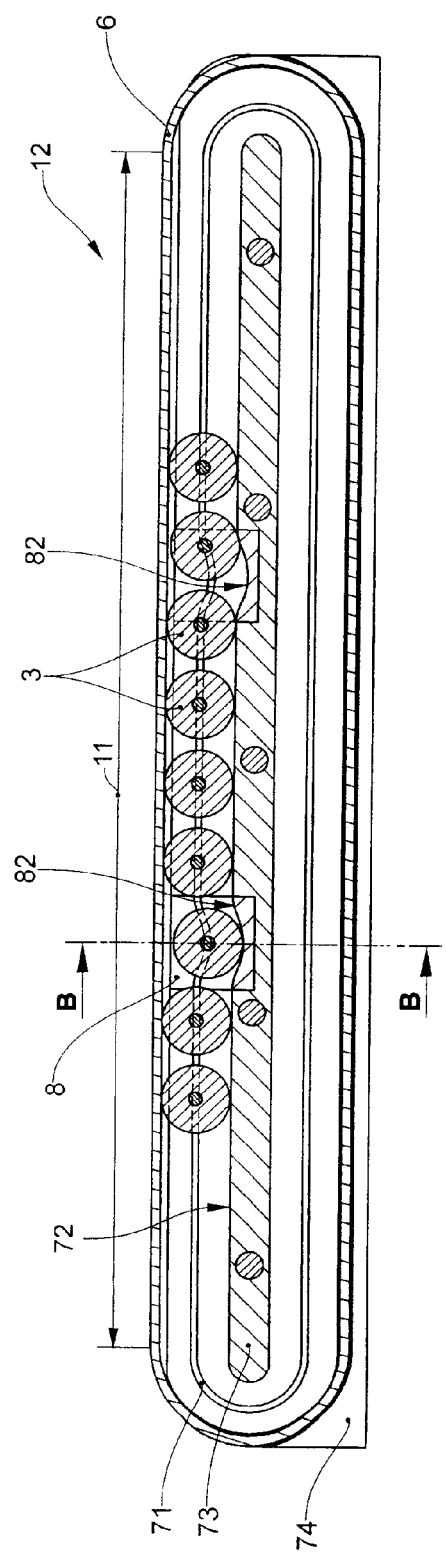

SUPPORT DEVICE FOR A CONVEYOR INSTALLATION AND METHOD FOR OPERATION OF A CONVEYOR INSTALLATION

BACKGROUND OF THE INVENTION

1. Field of the Invention

The invention relates to the field of conveyor technology. It relates to a support device for a conveyor installation and to a method for operation of a conveyor installation, according to the preamble of the respective patent claims.

2. Description of Related Art

It is known to provide conveyor installations, i.e. conveyor installations having linear guides with revolving rollers. Such conveyor installations comprise a roller body with a series of rollers, which roll along a path, so that the roller body supports the conveyed objects in a support region, wherein the rollers roll on a support surface in the support region. Certain types of linear guides, such as described in DE 20 2007 011 352 U1 for drawers, are designed for small loads. The relatively low forces which occur and the applied materials are matched to one another, so that no significant wear of the moved parts occurs. Linear guides are likewise known from machine tool construction, wherein roller bodies of steel are applied due to the high forces which occur. There exists the need to provide similar guides for conveyor technology, which may be applied as a support device for moved bodies, wherein high forces are to be accommodated and despite this, as inexpensive as possible, lightweight roller bodies should be able to be applied.

BRIEF SUMMARY OF THE INVENTION

It is therefore the object of the invention, to provide a method for operation of a conveyor installation, and a support device for a conveyor installation of the initially described type, which reduces the loading of the moved elements of the conveyor installation, in particular of the roller bodies. A further object is to provide the possibility of conveyor installations with inexpensive lightweight components.

This object is achieved by a method for operating a conveyor installation, and a support device for a conveyor installation, with the features of the respective patent claims.

According to the method for operating a conveyor installation, thus on rolling the rollers in the support region of a support device of a conveyor installation, the following steps are carried out:

relieving the rollers on entering into a part region of the support region;
aligning the relieved rollers;
renewed loading of the rollers on leaving the part region of the support device.

On relieving the rollers, the load force is assumed by other support elements. They may, for example, be further rollers of the same roller body, or additional stationary rollers or revolving rollers or sliding elements. The relief may be effected by way of the rollers running in a recess in the support region, and thus temporarily no longer being supported, and/or by way of the conveyed objects being temperately lifted by the other support elements. The term "lifting" here, according to the normal use of the invention, relates to the direction of gravity: generally speaking, the other support elements temporarily increase the distance between the conveyed objects and the support surface. This, for example, is effected by way of a belt or a mat chain or a conveyed unit load being lifted somewhat by the other support elements, and one or more of the rollers to be aligned being relieved by way of this.

The method prevents the negative effects due to the rollers not rolling in an ideal manner due to manufacturing tolerances, and tilting, jamming or laterally drifting on account of this, and wearing excessively due to this. For example, plastic rollers from large-scale manufacture may be slightly conical and, thus, have a tendency to roll laterally from the conveying direction. By way of the rollers being aligned again once or several times along the support region, one avoids them being forced into a position in which they wear too much.

If the roller body revolves endlessly in the support device, then the support region lies with the relief regions in the load section. The return section as a rule is not loaded, so that no relief is necessary there. If the return section is also loaded, i.e. if the support device on both sides in each case moves at least for a while along a body which presses against the support device, then preferably also at least a part region is also arranged in the return section, for relief.

The support device for supporting conveyed objects comprises a roller body with a sequence of rollers, which run along a roller path and support the conveyed objects in a support region of the roller path. Thereby, the rollers in the support region run on a support surface. At least one recess of the support surface is present in the support region in the mentioned part region for relief, wherein a roller which is located in the region of the recess, may be moved into the recess.

Load forces which act on the rollers are reduced in the region of the recess by way of this. Preferably, no load force at all acts on the rollers. The rollers thus in each case in the region of the at least one recess essentially lose contact with the conveyed objects, for example a conveyor means. The rollers are relieved by way of this, so that the direction of the rotation axis of the rollers may be corrected more easily. A roller, in the case that it was tilted, which means the direction of its rotation axis was not perpendicular to its rolling direction or to the conveying direction, may align itself perpendicular to the conveying direction again. The rotation axis of the rollers, for example, is defined, for example, by way of the rollers being shaped in a cylindrical or barrel-like manner. The rolling direction here and hereinafter indicates the translatory movement components of the centre of gravity of a rolling roller.

This has the advantage that the rollers, which—depending on the loading and depending on the non-ideality in the shape of the rollers, of the mounting of the rollers and of the support surfaces—tilt under load after a certain stretch, are aligned again. Thus, one prevents the tilted rollers with their pivots and/or peripheral surfaces and/or with their end-faces from rubbing on their guides and effecting an excessive wear. By way of this, it is in turn possible to manufacture rollers and guides of inexpensive and light materials.

The support device which is operated according to the invention above all is suitable for a non-cyclical, spontaneous conveyor operation, thus without a permanent loading of the components. The demands on the components are further reduced with this.

The direction in which the load acts on the support device and thus, via the rollers, on the support surface, as a rule is in the direction of gravity. Hereinafter, for the sake of simplicity of the description, the explanations are above all made in this context. In this context however the invention may also be applied with other directions of the loading. This means that the load, for example, acts in the horizontal direction (or obliquely), and the support surface runs essentially normally to the direction of the load.

The aligning of the roller axes may be effected by one of the following effects, or by way of a combination of these effects:

- with the rolling or sliding of the roller into the recess, the roller is relieved and aligns itself parallel to the recess. The moving into the recess may thereby be caused or driven by way of gravity and/or by a guiding of the rollers,
- with the moving-up out of the recess again, the roller is pushed or pulled against the upwardly running support surface and by way of this is aligned parallel to the recess. The aligning is thus driven by a mechanical guiding of the rollers,
- by way of lateral path narrowings, which engage on the end-sides of the roller and force the rollers laterally into a defined position (preferably in the middle of the roller path) and thereby also align the axis direction of the rollers. Preferably thereby, the end-sides of the rollers are parallel to the surfaces of the path narrowings.

The shape of the recess preferably corresponds essentially to the peripheral contour of a roller (seen in a longitudinal section along the rotation axis of the roller), in a cross section through the recess, in a section plane perpendicular to the conveying direction or rolling direction of the rollers. In a preferred embodiment of the invention. the recess is somewhat more pronounced in the region of the ends of the roller, thus in the regions on both sides of the middle line of the roller path, i.e. somewhat deeper than in the middle. It becomes simpler to rotate in the axis direction of the rollers by way of this.

Preferably, the recess has a continuous course, seen in a longitudinal section along the conveying direction or rolling direction of the rollers. This means that the rollers on moving or rolling into the recess or on moving or rolling out of the recess, do not move upwards or downwards in a jerky manner.

Preferably, the recess is shaped in a symmetrical manner seen in a longitudinal section along a conveying direction or rolling direction of the rollers. Irrespective of the movement direction of the roller body or of the rollers (forwards or backwards) thus the relief and alignment of the rollers take their course in the same manner. Preferably, the recess, seen along the conveying direction or rolling direction of the roller, has an extension of less than a triple preferably less than double the diameter of a roller.

In a preferred embodiment of the invention, the rollers are mounted and guided on projecting pivot stubs of the rollers, by way of these pivot stubs running in lateral guide grooves of the support body. The pivot stubs may be designed as one piece on the rollers, or by way of separate pivot parts which are inserted into the rollers. In another preferred embodiment of the invention, the rollers are mounted in a flexible connection body, which may likewise be mounted in a guide groove, either also by way of projecting pivot stubs of the rollers, or by way of projecting pivot elements of the connection body, which project into recesses of the rollers. These flexible connection bodies may also accomplish a distancing of the rollers. In a further preferred embodiment of the invention, the rollers are distanced by way of smaller co-running distancing rollers being present, which roll on the rollers (in the counter direction) but not on the support surface or on the conveyed objects. These distancing rollers are preferably likewise guided by way of pivot stubs in the same guide groove as the other rollers. The pivot stubs of the rollers and the distancing rollers may be provided with their own roller bearings for reducing the friction.

The rollers preferably comprise a rounding or chamfer at the transition between their end-sides and the peripheral surface (thus of the rolling surface). This simplifies the alignment of the rollers on the path narrowings and avoids a jamming.

In a preferred embodiment of the invention, path widenings are present in front of and/or after the path narrowings, where the rollers obtain a somewhat greater movement freedom also in the direction along their rotation axes, and this movement freedom encourages a compensation movement for aligning the roller axes. In a further preferred embodiment of the invention, only one path widening and no path narrowing is present in the region of the recess. The rollers are then aligned in the region of the recess, and with a subsequent (relative) narrowing to the normal width of the roller path, are laterally aligned as the case may be.

With the use of the support device in conveyor technology, the product to be conveyed, may basically be guided directly onto the rollers, so that the rollers roll on the product to be conveyed. The conveyed object is therefore the same as the product to be conveyed, thus unit loads, carriers or containers etc. Preferably however, a conveyor means is present, for example a conveyor belt or mat chain, on which the rollers roll, and on which the product to be conveyed is conveyed. The term "mat chain" here and hereinafter, in a summarising manner, indicates chained conveyor means, for example mat chains, hinge belt chains, plate belt chains, flex belts, chain belts, carrier chains. In this case, thus, the conveyed object is the same as the conveyor means, and the product to be conveyed lies on the conveyor means. Thereby, it is also possible for a co-moved protective belt to be arranged between a mat chain and the rollers, which protect the rollers from contamination, which could fall through the mat chain.

Basically, the described recess may be applied everywhere, where heavily loaded rollers need to be treated with care. This, for example, is the case in roller elements and driven roller elements, as are described in EP-A-1725482 (US-A-2008/0245640), EP-A-1758801 (US-A-2008/0078158) and EP-A-1778568 (US-A-2007/0267278), and likewise in combination with roller belts or connection bodies with applied rollers as are described in EP-A-1 858 782 (US-A-2008-0164124) and the Swiss patent application with the application number 0993/09 or its successor applications. Common to the devices in the mentioned patent applications, is the fact that they are directed towards light-running roller bodies which may be manufactured from lightweight and inexpensive components. In particular, preferably rollers and, as the case may be, also connection bodies, in which the rollers are mounted and distanced, are manufactured of plastic. According to this, with the use with high loads, the application of the present invention is particularly advantageous, in order to avoid a permanent tilting of the rollers and an excess wear of the rollers and/or the connection bodies.

The invention permits the provision of support devices or conveyor installations, which may be manufactured in a simple and inexpensive manner, and despite this may be greatly loaded, i.e. to a greater extent, than is otherwise normal with the applied materials, for example plastic rollers.

The path in which the rollers run, in preferred embodiments of the invention, is a revolving path, about which the rollers revolve in a closed path. In other embodiments of the invention, the path is not closed, and the rollers as also the possibly present conveyor means, perform to and from movements. The support surface in further preferred embodiments of the invention is not plane, but is slightly curved, be it in a concave or convex manner. Preferably, the objects rolling on the roller body also have a corresponding, complementary shape.

Further preferred embodiments are to be deduced from the dependent patent claims. Thereby, features of the method claims with regard to context may be combined with the device claims and vice versa.

BRIEF DESCRIPTION OF THE DRAWINGS

Hereinafter, the subject matter of the invention is explained in more detail by way of preferred embodiment examples which are represented in the accompanying drawings. In each case schematically, there are shown in:

FIGS. 5a-5b a support device with a recess for aligning the rollers;

The reference numerals used in the drawings and their significance are listed in a summarised manner in the list of reference numerals. Basically, in the figures, the same parts are provided with the same reference numerals

DETAILED DESCRIPTION OF THE INVENTION

Figure 1:
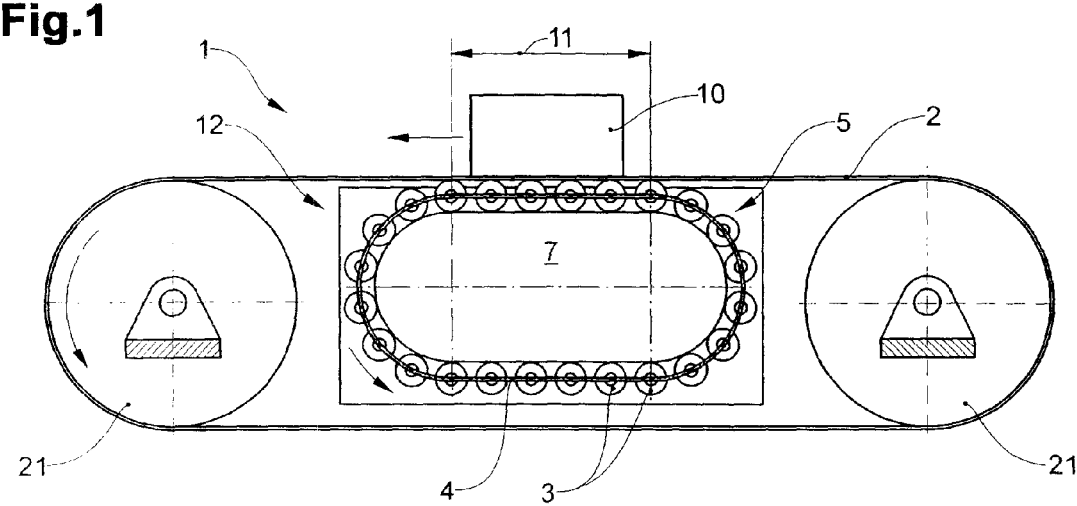
FIG. 1 a conveyor installation with an integrated support device and with a conveyor belt, FIGS. 2a-2b a support device as part of a conveyor installation, without means for aligning rollers.

FIG. 1 by way of example shows a conveyor installation 1, in which the recess according to the invention may usefully be arranged. However, the invention may also be applied to other types of conveyor installations and/or roller bodies. FIG. 1 schematically shows a conveyor installation 1 with a conveyor belt as conveyor means 2 for products to be conveyed 10, represented here by way of example as a unit load. The conveyor belt is led around deflection rollers 21. One or both of the deflection rollers 21 may be driven. A support device 12 is arranged along a support region 11, with a roller body 5 which revolves around a support body 7. The roller body 5 comprises revolving rollers 3 and a connection body 4 which forms a mounting for the rollers 3 and distances the rollers 3 from one another. The conveyor means 2 moves in a conveying direction with respect to the support device 12. Thereby, the rollers 3 roll on the conveyor means 2 and on the support body 7. Thus the support device 12 permits a highly-loadable and low-friction support of the conveyor means 2.

In another preferred embodiment of the invention (not illustrated), the roller body 5 also revolves around the deflection rollers 21. In a further preferred embodiment of the invention. the roller body 5 is of several parts and comprises several connection bodies 4 with rollers 3, said connection bodies running next to one another. Preferably, the roller body 5 is not driven itself, but is co-moved only on movement of the conveyor means 2. In other embodiments of the invention, a mat chain is present as a conveyor means 2 instead of the conveyor belt.

Figure 2A:
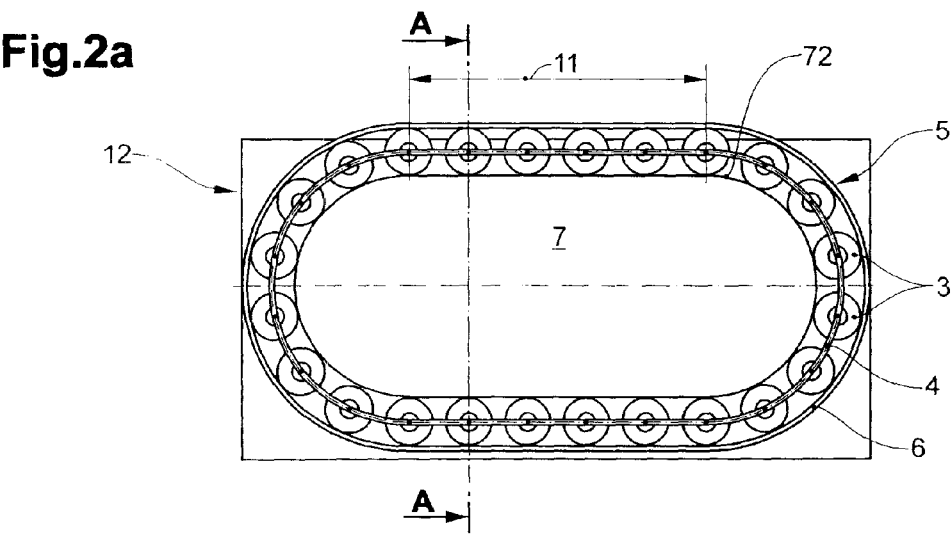
Figure 2B:
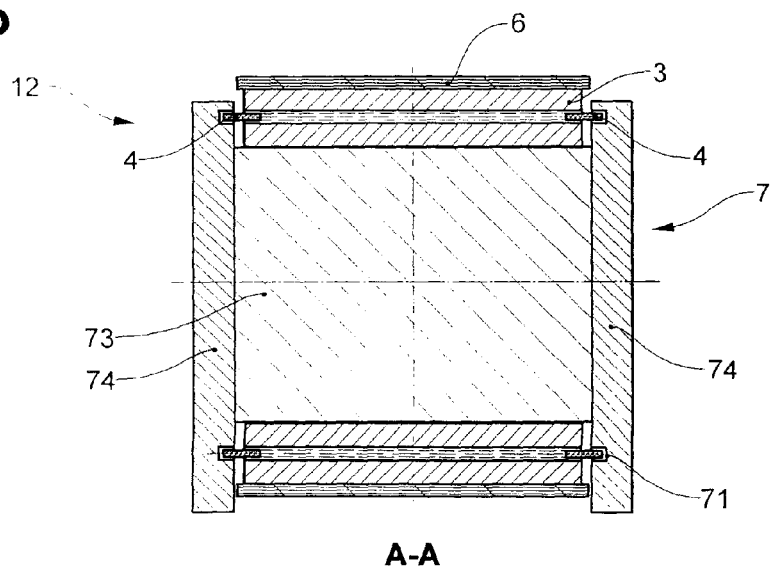

FIGS. 2a and 2b show a detail of a conveyor installation 1, specifically merely the support device 12, but additionally with a belt 6. The belt 6 may assume the function of the conveyor means 2 of FIG. 1, or with an arrangement of the support device 12 below a mat chain, may protect the roller body 5 from dirt which may fall through the mat chain. FIG. 2a shows a lateral view with a removed side element 74, FIG. 2b a cross section A-A in the region of a load-carrying support surface 72. Side elements 74 are arranged laterally on the central body 73, and laterally guide the rollers 3 and, with the central body 83, form a peripheral guide channel or a roller path. The side elements 74 comprise guide grooves 71 for guiding the connection body 4 in the support body 7. In other embodiments of the invention, the guide grooves 71 serve for guiding pivot elements of the rollers 3.

It may occur in the support devices 12 of FIGS. 1 and 2a-b, that the rollers 3, above all under load and with longer support regions 11, tilt and run up at an edge and are damaged thereby. For overcoming this, a recess 82 according to the invention may be realised with such and other support devices 12, as is explained by way of the FIGS. 5 to 9.

Figure 3:
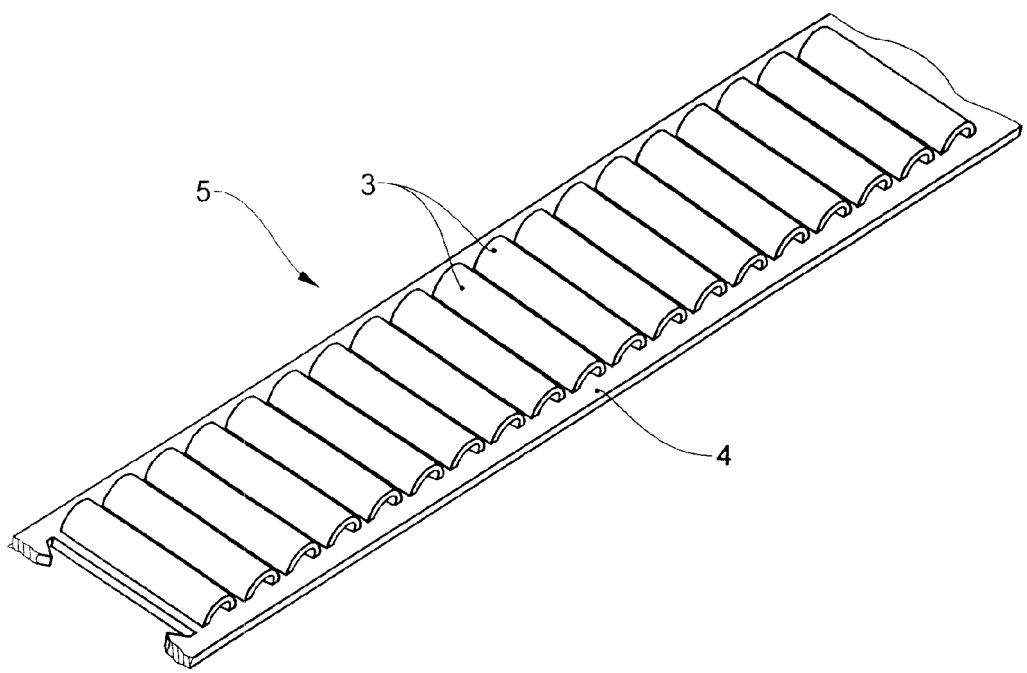
FIG. 3 a section of a roller body.

FIG. 3 shows a section of a roller body 5 with a connection body 4 and rollers 3 inserted therein. The connection body 4 for example is a flexible and preferably also elastic belt, into which the rollers 3 are inserted and mounted. In the connection body 4 shown here, a series of rollers 3 is present, but also connection bodies with several parallel-running series of rollers 3 may be present, or connection bodies 4 with a series of rollers, in each case with several rollers laterally next to one another, in which consecutive rollers are laterally offset from one another.

Figure 4:
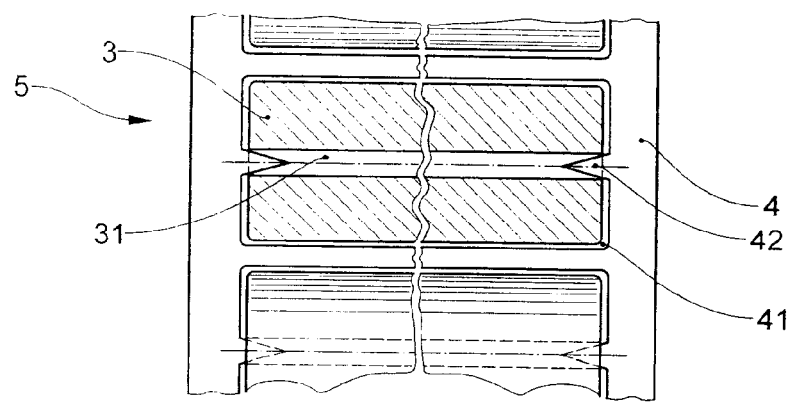
FIG. 4 a detail of a roller body.

FIG. 4 shows a detail of a roller body 5 with a longitudinal section through a roller 3 The connection body 4 comprises openings 41, on which bearing locations 42 are formed, by way of which the rollers 3 are mounted. The bearing locations 42, as shown, may be projections of the connection body 4, which engage into correspondingly shaped indentations or reliefs of the rollers 3. The reliefs of the rollers, as represented, may be designed as continuous holes 31, i.e. the rollers 3 are designed as sleeves or tube pieces. Alternatively, the reliefs may be merely designed as rotationally symmetrical recesses at the ends of the rollers. Preferably, the recesses are shaped tapering inwards. Thereby, the rollers are preferably shaped as (plastic) injection moulded parts. Vice versa, the rollers 3 may also comprise projecting pivot elements, which may be applied into openings of the connection body 4.

FIGS. 5a and 5b show a support device 12 with recesses 82 for relieving and for aligning the rollers 3. The proportions of the support device 12 are different to those of FIG. 2, but the manner of functioning is the same. Moreover, not all rollers 3 are drawn along the revolving path around the central body 73. Thus in reality, rollers 3 are present along the whole revolving path. FIG. 5a shows a lateral view with a removed side element 74, and FIG. 5b shows a cross section B-B in the region of a recess 82. The support surface 72 is formed on the central body 73. The recesses 82, by way of example, are designed in separate relief elements 8.

In the support region 11, the support surface 72 supports the rollers 3 and thus also, directly or via the belt 6, the conveyor means or goods to be conveyed (not drawn). In the region of the recess 82, the rollers 3 which are located there in each case are relieved. The rollers 3 there, on account of gravity and/or by way of a lateral guiding of the rollers 3, move downwards somewhat away from the belt 6. By way of this, they are easier to move and in the case that they have got into the load-carrying region with their rotation axis in an oblique position, may align themselves again, i.e. such that their rotation axis runs perpendicular to the rolling direction of the rollers 3.

In the schematic representation of FIG. 5a, the load-carrying regions, thus the regions of the support region 11 between the recess 82 and the deflection regions at the two ends of the support device 12, are drawn in a relatively short manner. They may also be longer relative to the region of the recess 82. The support device 12 according to FIGS. 5a-5b, comprises revolving rollers 3. In an analogous manner, of course one may also provide a support device with non-revolving rollers or with purely linearly moved rollers with a recess 82.

Thereby, the symmetry of the recess 82 acts in the rolling direction, by way of the same effect occurring irrespective of the roller direction The recesses 82 are drawn in the FIGS. 5a and 5b as separate elements or relief elements 8. Thus in other embodiments of the invention, they may also be formed on the support surface 72 and on the side elements 74, thus without a separate component being required for forming the recess 82.

Figure 6A:
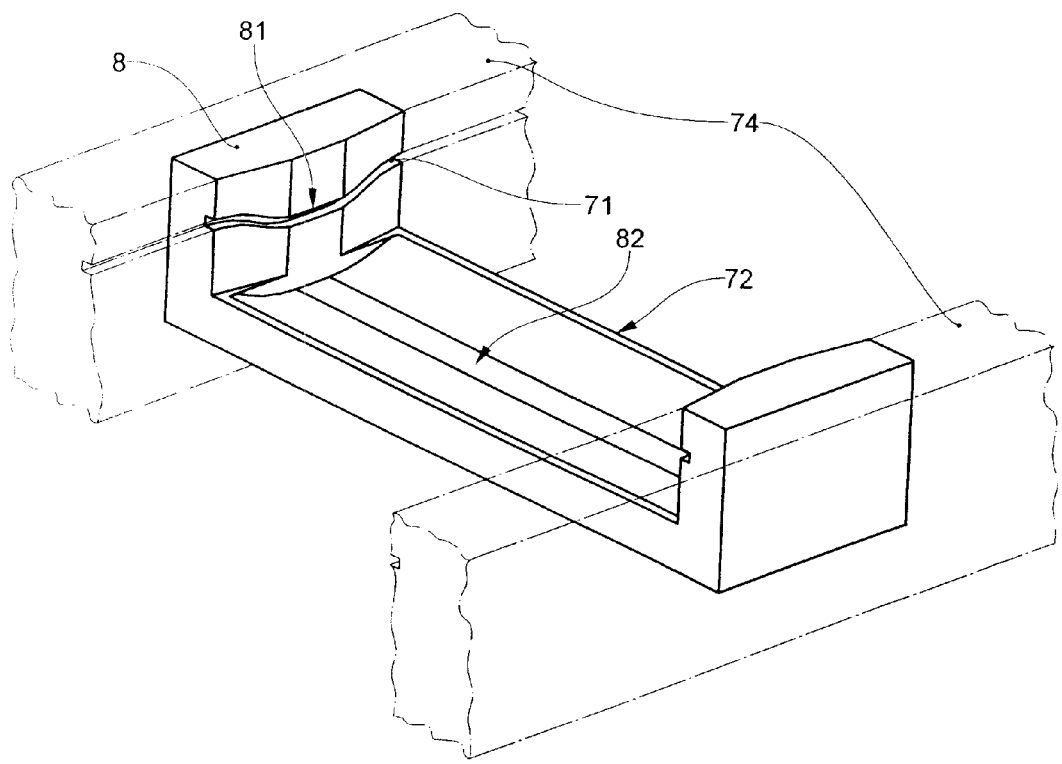
FIGS. 6a-6b a relief element.
Figure 6B:
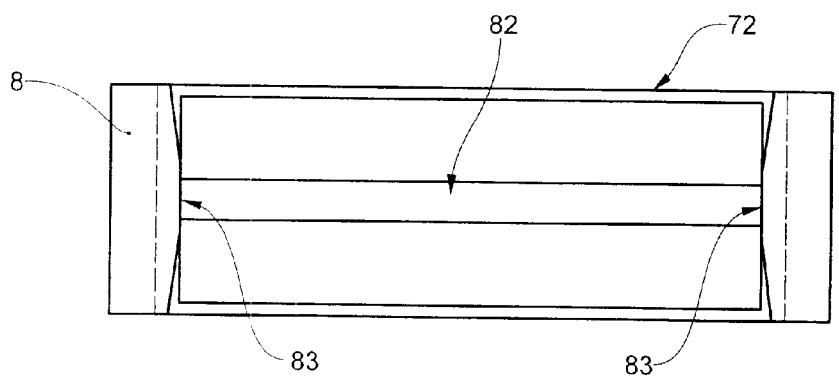

FIGS. 6a and 6b show a relief element 8 in a perspective view and in a view from above, i.e. onto the support surface 72. In FIG. 6a, the position of the side elements 74 with an inserted relief element 8 is shown in a dashed manner. The support surface 72 in the represented relief element 8 is visible only completely at the edge of the recess 82 and merges in a coplanar manner into the support surface 72 on the central body 73. The relief element 8, as mentioned, may be a separate individual part, or be recessed at a section of the roller path on one or more parts, thus for example on the central body 73 and on the side element 74. Thus, the recess 82 of the support surface 72 is formed in the region of the support surface 72, and a lowering 81 of the guide groove 71 is formed in the region of the guide groove 71. The recess 82 of the support surface 72 extends essentially over the whole width of the support surface 72, so that a roller 3 in this region may be moved downwards and may thus be relieved. The lowering 81 of the guide grooves 71 encourages this movement, by way of a connection body 4, likewise in the region of the recess 82 of the support surface 72, being led downwards. In the case that the rollers 3 are guided in the guide groove 71 by way of projecting pivot elements, their lowering 81 acts in the same manner.

As is visible in FIG. 6a, two or more recesses 82 may be arranged along the support region 11 depending on the length of the support region 11.

Figure 7:
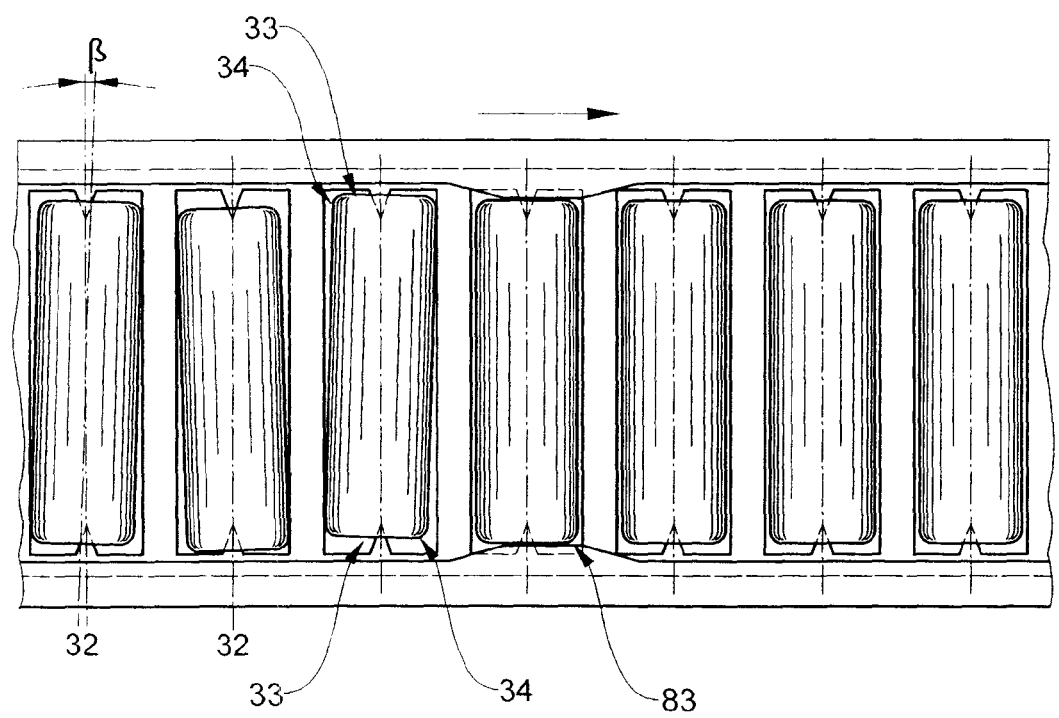
FIG. 7 the alignment of a series of rollers.

Preferably, furthermore, a lateral path narrowing 83 of the roller path is present in the region of the recess 82. By way of this, rollers on travelling past are laterally positioned, in particular are centred, and the movement for aligning their axes perpendicular to the conveying direction is encouraged. FIG. 7 schematically shows the alignment of a series of rollers 3, which are led from the left to the right past a recess 82 (itself not visible) with a path narrowing 83. Left of the path narrowing 83, the rollers 3 are tilted with their axis directions 32 with respect to the connection body, by an angle β. The end-sides 33 of the rollers 3 are led parallel through the path narrowing 83. The alignment of the rollers 3 thus includes a rotation of the direction 32 of the rotation axis of the rollers 3 and/or a displacement along the direction 32 of the rotation axis. Chamfers or roundings in the transition region between the end-sides 33 and the peripheral surfaces of the rollers 3 prevent a jamming of the rollers 3 at the path narrowing 83.

Figure 8:
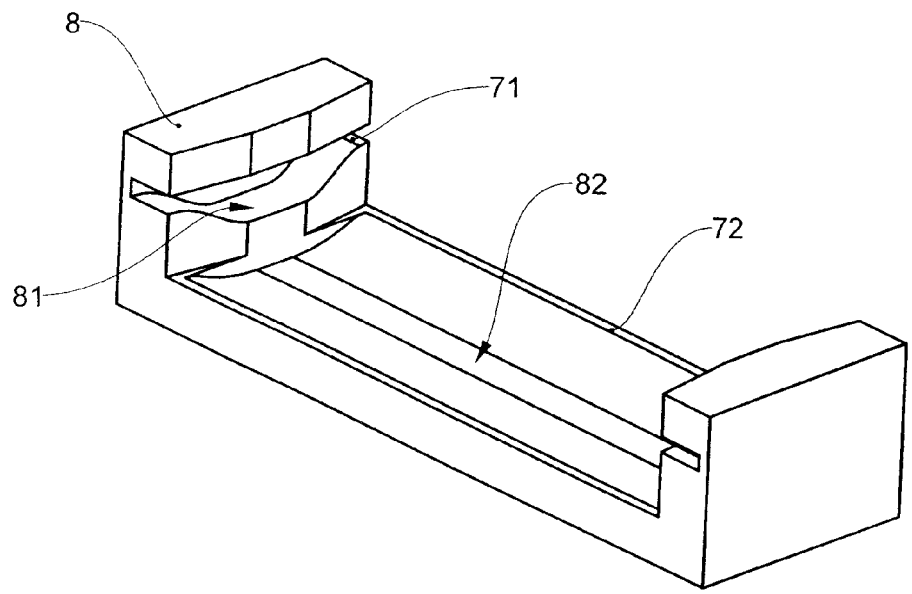
FIGS. 8-9 variants of a relief element.

FIG. 8 shows a variant of a relief element 8, in which the lowering 81 of the guide groove 71, although permitting a movement of the rollers to the bottom, in particular when they are mounted in a connection body 4, however does not force this. The roller 3 may deflect a little downwards, depending on the tension which acts on the connection bodies 4, and depending on the weight of the rollers 3. The roller may be aligned already by way of it hanging in the mounting in the connection body 4 in an unloaded manner. Moreover, the roller 3 may also be aligned when, hanging in such a manner, although not contacting the lowest point of the recess 82, hits the rising region of the recess 82. In a further preferred embodiment of the invention, the guide groove 71 runs straight ahead without a lowering 81, and the alignment of the rollers 3 is effected by way of the rollers 3 staying in their mounting in the connection body 4 in an unloaded manner thanks to the recess 82.

Figure 9:
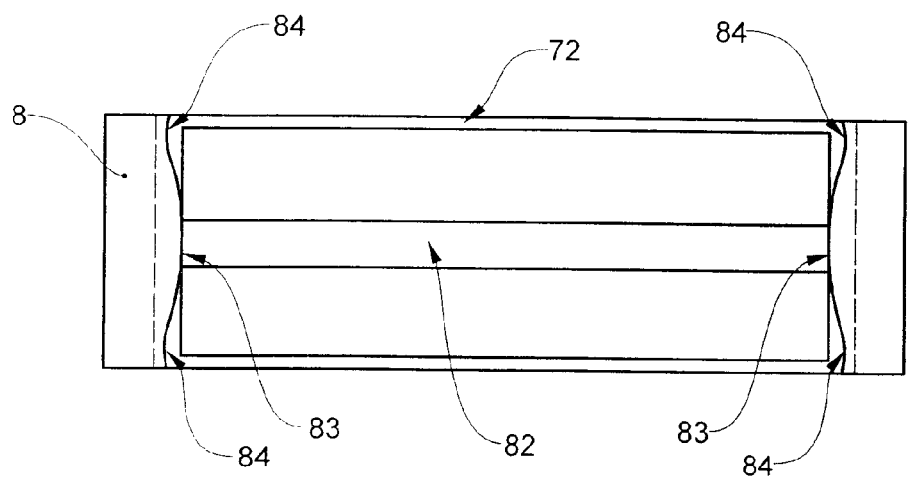

FIG. 9 shows a relief element 8, in which also one or two path widenings 84 are formed connecting to the path narrowing 83. These allow the rollers, in the case that they are in contact with their end-sides 33 with the side elements 34, to firstly be free of friction forces thanks to the path widenings 84. By way of this, the rollers 3 align themselves with their axes. They are subsequently centred by way of path narrowing 83.

This shows the support device 12 in principle may be realised in any size. With an application in conveyor technology, the roller diameters are about approx. 10 mm to 20 mm or 30 mm, and roller lengths of 20 mm to 100 mm are useful. Thereby, preferably the rollers are of plastic.

LIST OF REFERENCE NUMERALS 1 conveying direction
11 support region
12 support device
2 conveyor means
21 deflection roller
3 roller
31 relief
32 axis direction
33 end-side
34 chamfer
4 connection body
41 opening
42 projection
5 roller body
6 belt
7 support body
71 guide groove
72 support surface
73 central body
74 side element
8 relief element
81 lowering reduction of the guide groove
82 recess of the support surface
83 path narrowing
84 path widening
10 goods to be conveyed

The invention claimed is:

1. A method for operating a support device for supporting conveyed objects, with which a roller body, comprising a series of rollers which roll along a path, supports the conveyed objects in a support region, wherein the rollers in the support region roll on a support surface, and wherein the method comprises the steps:
   relieving the rollers on entering into a part region of the support region;
   aligning the relieved rollers;
   renewed loading of the rollers on leaving the part region of the support device.

2. A method according to claim 1, wherein the steps of relieving-aligning-loading are repeated several times for a roller moved along the support region.

3. A method according to claim 1, wherein the alignment of the relieved rollers is driven by the intrinsic weight of the rollers, or the alignment of the relieved rollers is driven by mechanical guiding of the rollers.

4. A method according to one claim 1, wherein the alignment includes a rotation of the axis direction of the rotation axis of the rollers or a displacement along the axis direction of the rotation axis.

5. A method according to claim 1, wherein the rollers revolve endlessly in the support device.

6. A method according to claim 1, wherein the rollers execute a to and fro moment in the support device.

7. A support device for supporting conveyed objects, comprising:
   a roller body with a series of rollers, which roll along a path and support the conveyed objects in a support region,
   wherein the rollers in the support region roll on a support surface, and
   wherein means for relieving, aligning and renewed loading of the rollers are provided in a part region of the support device.

8. A support device according to claim 7, wherein at least one recess of the support surface is present as a means for relieving, aligning and renewed loading, and a roller which is located in the region of the recess, may be moved into the recess.

9. A support device according to claim 8, wherein the recess, seen in a longitudinal section along a conveying direction or rolling direction of the rollers, has a continuous course.

10. A support device according to claim 8, wherein the recess, seen in a longitudinal section along a conveying direction or rolling direction of the rollers, is shaped in a symmetrical manner.

11. A support device according to claim 8, wherein the recess, seen along the conveying direction or rolling direction of the rollers, has an extension of less than triple the diameter of a roller.

12. A support device according to claim 7, wherein at least further support elements are present as means for relieving, aligning and renewed loading, comprising, stationary or co-running rollers, which lift the conveyed objects temporarily relative to the support surface, in the part region.

13. A support device according to claim 7, wherein the rollers are shaped in a cylindrical or barrel-like manner.

14. A support device according to claim 7, further comprising a path narrowing for the lateral positioning of the rollers in the region of the recess.

15. A support device according to claim 7, further comprising a path widening, which permits the rollers a greater lateral movement clearance than in the remaining support region.

16. A support device according to claim 7, wherein the rollers at a transition between the end-sides and the peripheral surface, have a rounding or a chamfer.

17. A support device according to claim 7, wherein at least in the support region, a conveyor means rolls on the rollers, wherein this conveyor means is a conveyor belt or a mat chain.

* * * * *